United States Patent
Anderson et al.

(10) Patent No.: US 9,235,517 B2
(45) Date of Patent: Jan. 12, 2016

(54) IMPLEMENTING DYNAMIC CACHE ENABLING AND DISABLING BASED UPON WORKLOAD

(71) Applicant: GLOBALFOUNDRIES Inc., Grand Cayman (KY)

(72) Inventors: Clark A. Anderson, Rochester, MN (US); Adrian C. Gerhard, Rochester, MN (US); David Navarro, Austin, TX (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 153 days.

(21) Appl. No.: 13/964,365

(22) Filed: Aug. 12, 2013

(65) Prior Publication Data

US 2015/0046648 A1    Feb. 12, 2015

(51) Int. Cl.
    *G06F 12/00*      (2006.01)
    *G06F 12/08*      (2006.01)

(52) U.S. Cl.
    CPC ........ *G06F 12/0802* (2013.01); *G06F 12/0888* (2013.01); *G06F 12/0866* (2013.01); *G06F 2212/502* (2013.01)

(58) Field of Classification Search
None
See application file for complete search history.

(56) References Cited

U.S. PATENT DOCUMENTS

| | | | | |
|---|---|---|---|---|
| 4,942,518 A | * | 7/1990 | Weatherford et al. | 711/138 |
| 5,163,142 A | * | 11/1992 | Mageau | 711/142 |
| 5,625,793 A | * | 4/1997 | Mirza | 711/138 |
| 5,729,713 A | * | 3/1998 | Leyrer | 711/138 |
| 6,128,717 A | * | 10/2000 | Harrison et al. | 711/202 |
| 6,345,341 B1 | | 2/2002 | Arimilli et al. | |
| 7,461,230 B1 | * | 12/2008 | Gupta et al. | 711/170 |
| 8,312,181 B1 | | 11/2012 | Faith et al. | |
| 2003/0033593 A1 | | 2/2003 | Duesterwald et al. | |
| 2004/0039886 A1 | | 2/2004 | Christofferson et al. | |
| 2004/0117441 A1 | * | 6/2004 | Liu et al. | 709/203 |
| 2004/0193803 A1 | * | 9/2004 | Mogi et al. | 711/129 |
| 2009/0100224 A1 | * | 4/2009 | Wang | 711/118 |
| 2012/0054446 A1 | | 3/2012 | Wang | |
| 2012/0131278 A1 | * | 5/2012 | Chang et al. | 711/118 |
| 2015/0019823 A1 | * | 1/2015 | Wang et al. | 711/136 |

OTHER PUBLICATIONS

Hi-Ching Chi, Henry Dietz; Improving Cache Performance by Selective Cache Bypass, 1989; IEEE; p. 277-284.*
Teresa L. Johnson, Wen-Mei W. Hwu; Run-Time Cache Hierarchy Management via Reference Analysis; 1997; ACM; pp. 315-326.*
Lingda Li, Dong Tong, Zichao Xie, Junlin Lu, Xu Cheng; Optimal Bypass Monitor for High Performance Last-Level Caches; 2012; ACM; pp. 315-324.*
C. Mohan, "Caching Technologies for Web Applications", Sep. 2001.
Hiroaki Kobayashi et al., "Locality Analysis to Control Dynamically Way-Adaptable Caches", vol. 33, No. 3, Jun. 2005.

* cited by examiner

*Primary Examiner* — Baboucarr Faal
(74) *Attorney, Agent, or Firm* — Heslin Rothenberg Farley & Mesiti P.C.

(57) ABSTRACT

A method, system and memory controller for implementing dynamic enabling and disabling of cache based upon workload in a computer system. Predefined sets of information are monitored while the cache is enabled to identify a change in workload, and selectively disabling the cache responsive to a first identified predefined workload. Monitoring predefined information to identify a second predefined workload while the cache is disabled, and selectively enabling the cache responsive to said identified second predefined workload.

20 Claims, 5 Drawing Sheets

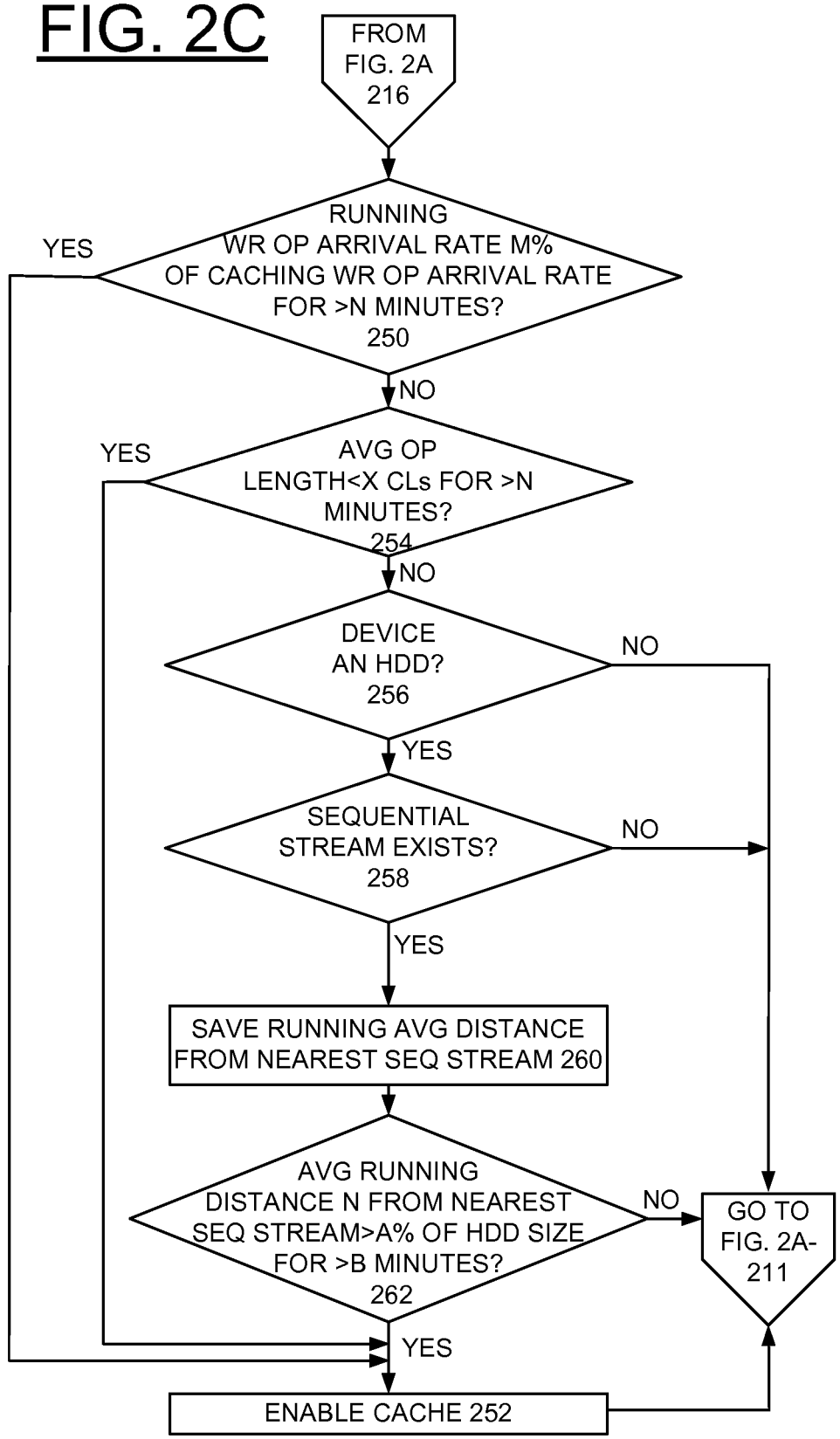

IMPLEMENTING DYNAMIC CACHE ENABLING AND DISABLING BASED UPON WORKLOAD

FIELD OF THE INVENTION

The present invention relates generally to the data processing field, and more particularly, relates to a method, system and memory controller for implementing dynamic enabling and disabling of cache based upon workload in a computer system.

DESCRIPTION OF THE RELATED ART

Modern computer systems typically are configured with a large amount of memory in order to provide data and instructions to one or more processors in the computer systems.

Historically, processor speeds have increased more rapidly than memory access times to large portions of memory, in particular, DRAM memory (Dynamic Random Access Memory). Memory hierarchies have been constructed to reduce the performance mismatches between processors and memory. For example, most modern processors are constructed having an L1 (level 1) cache, constructed of SRAM (Static Random Access Memory) on a processor semiconductor chip. L1 cache is very fast, providing reads and writes in only one, or several cycles of the processor. However, L1 caches, while very fast, are also quite small, perhaps 64 KB (Kilobytes) to 256 KB. An L2 (Level 2) cache is often also implemented on the processor chip. L2 cache is typically also constructed using SRAM storage, although some processors utilize DRAM storage. The L2 cache is typically several times larger in number of bytes than the L1 cache, but is slower to read or write. Some modern processor chips also contain higher level cache, such as an L3 (Level 3) cache. L3 cache is capable of holding several times more data than the L2 cache. L3 cache is sometimes constructed with DRAM storage. L3 cache in some computer systems is implemented on a separate chip or chips from the processor, and is coupled to the processor with wiring on a printed wiring board (PWB) or a multi-chip module (MCM). Main memory of the computer system is typically large, often many GB (gigabytes) and is typically implemented in DRAM.

Main memory is typically coupled to a processor with a memory controller, which may be integrated on the same device as the processor or located separate from the processor, often on the same MCM (multi-chip module) or PWB. The memory controller receives load or read commands and store or write commands from the processor and services those commands, reading data from main memory or writing data to main memory. Typically, the memory controller has one or more queues, for example, read queues and write queues. The read queues and write queues buffer information including one or more of commands, controls, addresses and data; thereby enabling the processor to have multiple requests—including read and/or write requests, in process at a given time.

Extensive research and development efforts are invested by the industry, on an ongoing basis, to create improved, innovative solutions for maximizing overall system performance and density by improving the memory system or memory subsystem design and operation.

Very often a cache in front of or within a storage device or storage subsystem can yield a very large performance gain. This results from coalescence, write hits, read hits, lower response times, and burst absorbency. This very large performance gain is most obvious in workloads such as journaling with many small sequential writes, transactions workloads with high spatial affinity, and low queue depth writes, where response time is paramount.

However, caches can also be a detriment. Caches require more management and often require more hardware operations. This can be seen most obviously with two extreme workloads. Totally random small writes will quickly fill the cache and the cache will simply be management overhead. However, depending on the exact cache algorithms and the type of devices under the cache, the cache may still benefit this workload as it reorders the operations (ops) to be more sequential. For example, a cache which destages ops with an escalator scheme is likely to benefit spinning drives. Totally sequential large or maximum sized ops will suffer as they do not benefit from overwrites or coalescence yet they do cause extra hardware operations and software/firmware management overhead to safely keep the data in cache.

As an example, assume a pair of caching storage adapters with a mirroring mechanism between them to maintain redundant copies of cache can sustain a maximum of 1.3 GB/s of write data throughput being mirrored between the two cards. Now also assume that when not caching, each card can deliver 2.2 GB/s to the drives under it. Finally assume that the drives under the adapter pair can maintain 5 GB/s on a large sequential workload, 200 MB/s on a small random workload without cache, and 800 MB/s on a small random workload with cache.

If a user simply runs with the cache on, the large sequential workload would top out at 1.3 GB/s and the small random workload would top out at 800 MB/s.

If the user simply runs with the cache disabled, the large sequential workload would top out at 4.4 GB/s but the small random workload would only hit 200 MB/s.

It should be noted that in nearly all caching storage systems, the act of enabling and disabling cache is not free. Enabling and disabling cache come with hardware, firmware, and or software overhead.

Some workloads are cache unfriendly, meaning that the act of enabling cache will cause overall performance to degrade. However, some workloads are cache friendly meaning that the act of caching will reduce the demand on some other component in the storage system allowing overall performance to improve. One known cache unfriendly workload is large sequential writes. All the data must be moved through the system and no coalescence or overwrite gains are provided by cache. However, all of the overhead, associated with keeping redundant copies, managing the data, storing the data non-volatile, destaging the data to the drives, and other penalties are incurred.

A need exists for an effective mechanism for implementing dynamic enabling and disabling of cache to improve performance in a computer system.

As used in the following description and claims, the terms controller or memory controller should be broadly understood to include a memory controller, a storage controller, an input/output (IO) adapter (IOA), and a storage interface; and the term cache should be broadly understood to include various cache memory arrangements, including storage adapter cache, and processor cache.

SUMMARY OF THE INVENTION

Principal aspects of the present invention are to provide a method, system and memory controller for implementing dynamic enabling and disabling of cache based upon workload in a computer system. Other important aspects of the present invention are to provide such method, system and memory controller substantially without negative effects and that overcome many of the disadvantages of prior art arrangements.

In brief, a method, system and memory controller for implementing dynamic enabling and disabling of cache based upon workload in a computer system. Monitoring of predefined sets of information while the cache is enabled to identify a change in workload, and selectively disabling the cache responsive to a first identified predefined workload. Monitoring predefined information to identify a second predefined workload while the cache is disabled, and selectively enabling the cache responsive to the identified second predefined workload.

In accordance with features of the invention, monitoring predefined sets of information includes monitoring one or more of predefined locality information, predefined cache operation statistics information, and predefined performance metrics information.

In accordance with features of the invention, selectively disabling the cache is provided responsive to an identified predefined substantially sequential write workload.

In accordance with features of the invention, monitoring predefined information to identify a second predefined workload while the cache is disabled includes monitoring one or more of a running average write operation arrival rate and an average write operation size.

In accordance with features of the invention, selectively disabling the cache is provided responsive to an identified predefined workload other than a substantially sequential write workload.

In accordance with features of the invention, monitoring of predefined sets of information while the cache is enabled to identify a change in workload and monitoring predefined information to identify a second predefined workload while the cache is disabled includes monitoring statistical information.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2A, 2B, and 2C together provide a flow chart illustrating example operations for implementing dynamic enabling and disabling of a cache based upon workload, such as in the computer system of FIG. 1 in accordance with the preferred embodiments.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and memory controller are provided for implementing dynamic enabling and disabling of a cache based upon workload. A low overhead method is provided to identify a workload and dynamically enable and disable the cache to address the case where cache is a detriment in large sequential or somewhat sequential workloads.

In accordance with features of the invention, a low overhead method is performed to identify a large sequential or somewhat sequential write workload while cache is enabled. A low overhead method is performed to identify a workload other than a large sequential or somewhat sequential write workload while cache is not enabled.

In accordance with features of the invention, the low overhead method performed while cache is enabled must identify a change in workload where the workload becomes cache unfriendly. This is done, for example using multiple different sets of information, such as including locality information, cache op statistics, and performance metrics.

Figure 1:
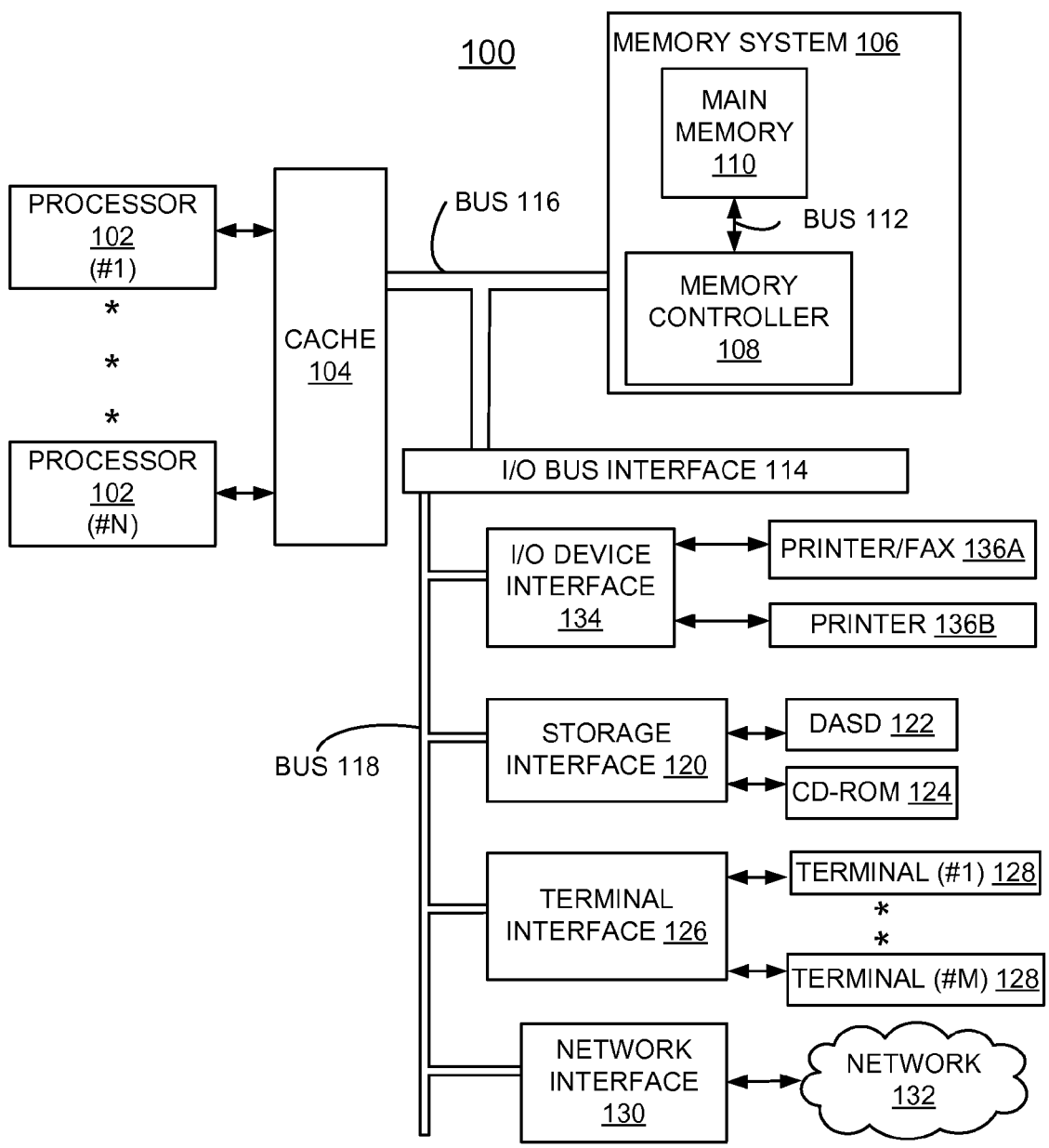
FIG. 1 is a block diagram of an example computer system embodying the present invention.

Having reference now to the drawings, in FIG. 1, there is shown a computer system embodying the present invention generally designated by the reference character 100 for implementing dynamic enabling and disabling of a cache based upon workload in accordance with the preferred embodiment. Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a memory system 106 including a memory controller 108 and a main memory 110 connected by a bus 112. Bus 112 is one or more busses that send address/command information to main memory 110 and send and receive data from the memory 110. Main memory 110 is a random-access semiconductor memory for storing data, including programs. Main memory 110 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, memory controller 108 and I/O bus interface unit 114. I/O bus interface 114 is further coupled to system I/O bus 118 for transferring data to and from various I/O units.

As shown, computer system 100 includes a storage interface 120 including a cache 121, and coupled to storage devices, such as, a direct access storage device (DASD) 122, and a CD-ROM 124. Computer system 100 includes a terminal interface 126 coupled to a plurality of terminals 128, #1-M, a network interface 130 coupled to a network 132, such as the Internet, local area or other networks, and a I/O device interface 134 coupled to I/O devices, such as a first printer/fax 136A, and a second printer 136B.

I/O bus interface 114 communicates with multiple I/O interface units 120, 126, 130, 134, which are also known as I/O processors (IOPs) or I/O adapters (IOAs), through system I/O bus 116. System I/O bus 116 is, for example, an industry standard PCI bus, or other appropriate bus technology.

In accordance with features of the invention, a selected one of the processor 102, the memory controller 108 or storage interface 120 can be used to implement methods for dynamic enabling and disabling of a cache, such as cache 104 and/or cache 121, based upon workload in accordance with the preferred embodiment including a low overhead method to identify a large sequential or somewhat sequential write workload while cache is enabled and a low overhead method to identify a workload other than a large sequential or somewhat sequential write workload while cache is not enabled.

Computer system 100 is shown in simplified form sufficient for understanding the present invention. The illustrated computer system 100 is not intended to imply architectural or functional limitations. Although main memory 110, cache 104 and cache 121 are represented conceptually in FIG. 1 as single entities, it will be understood that in fact these are more complex, and that cache may exist at multiple different levels, as is known in the art. The present invention can be used with various hardware, software and firmware implementations and systems, various other internal software and firmware, and other internal hardware devices.

In accordance with features of the invention, a low overhead method utilizes predefined different sets of information. Each block of data kept in a cache is represented by a cache line or CL. Each CL keeps information such as the drive and Logical Block Address (LBA) the data is associated with as well as other state information. In addition, this CL advantageously keeps a locality bit, which provides an indication if the data logically previous to this data exists in cache. As each write op is processed, only the CL logically preceding the first CL of the write op must be checked, as all subsequent CLs comprising the write are by definition logically following data which is in cache. The total number of CLs with the locality bit on being put into the cache on each write is simply the length of the op (in units of CLs) minus one plus one if the first CL had the locality bit turned on. Then upon a destage, a sum of the locality bits in the CLs being destaged easily enables keeping a total count of locality bits for each drive where cache is enabled.

In accordance with features of the invention, in addition to the information in the CLs, statistics can be kept about the operation of the cache. For example, the number of write hits, the number of overwrites, the total number of writes, total number of fast writes, which are writes that did not have to wait for space to free up, and the number of destages advantageously are kept with very little overhead. In addition to the number of each type of event, the block count (CL count) of each type of event can also be kept.

In accordance with features of the invention, using the total number of locality bits turned on, the total number of CLs in cache, and other cache statistics, it is possible to identify possible unfriendly cache workloads. First, if the locality bits indicate that all, or very nearly all, of the data in cache has locality, for example where a total number of locality bits turned on divided by the total number of CLs in cache is equal to or greater than 95%, then further checking can be done. Next, if the average incoming block size, which is the total blocks written divided by the total number of writes, is large, further checking can be done. Next If the number of write hits relative to the number of writes is very low, for example 2% or less, or if the number of destages is close to the number of writes, for example 98% to 120%, this indicates that the workload consists of large sequential writes.

In accordance with features of the invention, it must be determined that turning off the cache would help. It is possible that the large sequential write workload is at a very low queue depth and thus cache is benefiting the workload by providing very low response times. Or, the cache may be full because the drives can not keep up and thus turning off cache would not help either. In this case, the cost of flushing the cache could be very high. However, if the hardware or management resources to maintain a cache are stressed, disabling the cache will provide a benefit. For example, in enterprise storage solutions, cache data is kept nonvolatile and mirrored to multiple physical locations. This mirroring action and nonvolatile attribute can sometimes be a limiting factor.

In accordance with features of the invention, three possible methods to detect this cache induced bottleneck are provided including:
1. Watch the throughput using statistics for the various cache related interfaces. As the blocks written into cache approaches the limit of the limiting interface, for example within 5%, it can then be assumed that the interface is the bottleneck.
2. Check utilization counters or queue depth counters. As the hardware or CPU indicates that it is at its limit, we now know our workload would benefit from turning cache off.
3. Monitor response times of the hardware or software/firmware operations. If the operations exceed a set threshold for enough ops, it can be assumed that too much work is backed up on the resource.

In accordance with features of the invention, regardless of which metric is used, a threshold must be picked to initiate the flushing of cache and transition to not caching. For example, if it is detected that the bottleneck is due to caching resources 90% of the time during a 10 minute interval, the storage system could flush and disable the cache. Also, while caching, the average running write op arrival rate should be monitored. When the cache is about to be disabled, the average arrival rate at that time should be saved away as the caching arrival rate.

In accordance with features of the invention, in addition to dynamically disabling the cache using data available while caching, dynamically enabling cache when the workload turns cache friendly again is provided. One key aspect of disabling the cache is the processing savings. Thus, whatever mechanism used to identify a workload changing to a cache friendly workload must add very little overhead or at least significantly less than maintaining a cache.

In accordance with features of the invention, as is needed for deciding when to disable cache, as each new write op arrives, the running average incoming op size must be maintained. Specific to enabling a disabled cache, the running average arrival rate must also be kept. For solid state drives, which are not impacted by seeks and rotational latency, only the average incoming block size and arrival rate need to be considered. If the arrival rate stays consistently below the caching arrival rate, it will likely be advantageous to re-enable cache. Thus some threshold ratio and time must be picked to make this decision. For example, if the arrival rate is 30% below the cache arrival rate for more than 2 minutes, then it is likely beneficial to enable caching once again.

In accordance with features of the invention, also if the average op size drops, caching may again be advantageous. Similar to average arrival rate, a threshold ratio and time must be picked. An example is: if the average op size drops below 200K for more than 2 minutes, then it is likely beneficial to enable caching once again.

It should be noted that arrival rate and average op size may be interrelated. That is, smaller ops with a higher arrival rate may actually be less taxing on a cache system as the overall data rate may be lower. By evaluating both parameters we can ensure that if the workload turns cache friendly again, we will begin caching.

In accordance with features of the invention, also for spinning drives, or hard disk drives (HDDs), where performance is greatly impacted by data locality, the average seek distance must also be considered in addition to average arrival rate and average op size. Just like the other two parameters, the average seek distance should be assessed against predefined thresholds. An example is: if the average seek distance is greater than 1/32 of the drive for 15% of the ops for 3 minutes, then it is likely beneficial to enable caching once again. To account for multiple simultaneous sequential streams being requested, and not artificially computing average seek lengths that may be inflated higher than they should be, detection of sequential streams must be performed and the running average distance from the nearest sequential stream must be kept and used.

In accordance with features of the invention, with these methods, the benefits of caching can be had without the detriments of caching being felt on very cache unfriendly workloads. As in the example listed above, with the large sequential workload, after the preset threshold time, would achieve 4.4 GB/s and the small random workload, after the preset threshold time would achieve 800 MB/s.

Figure 2A:
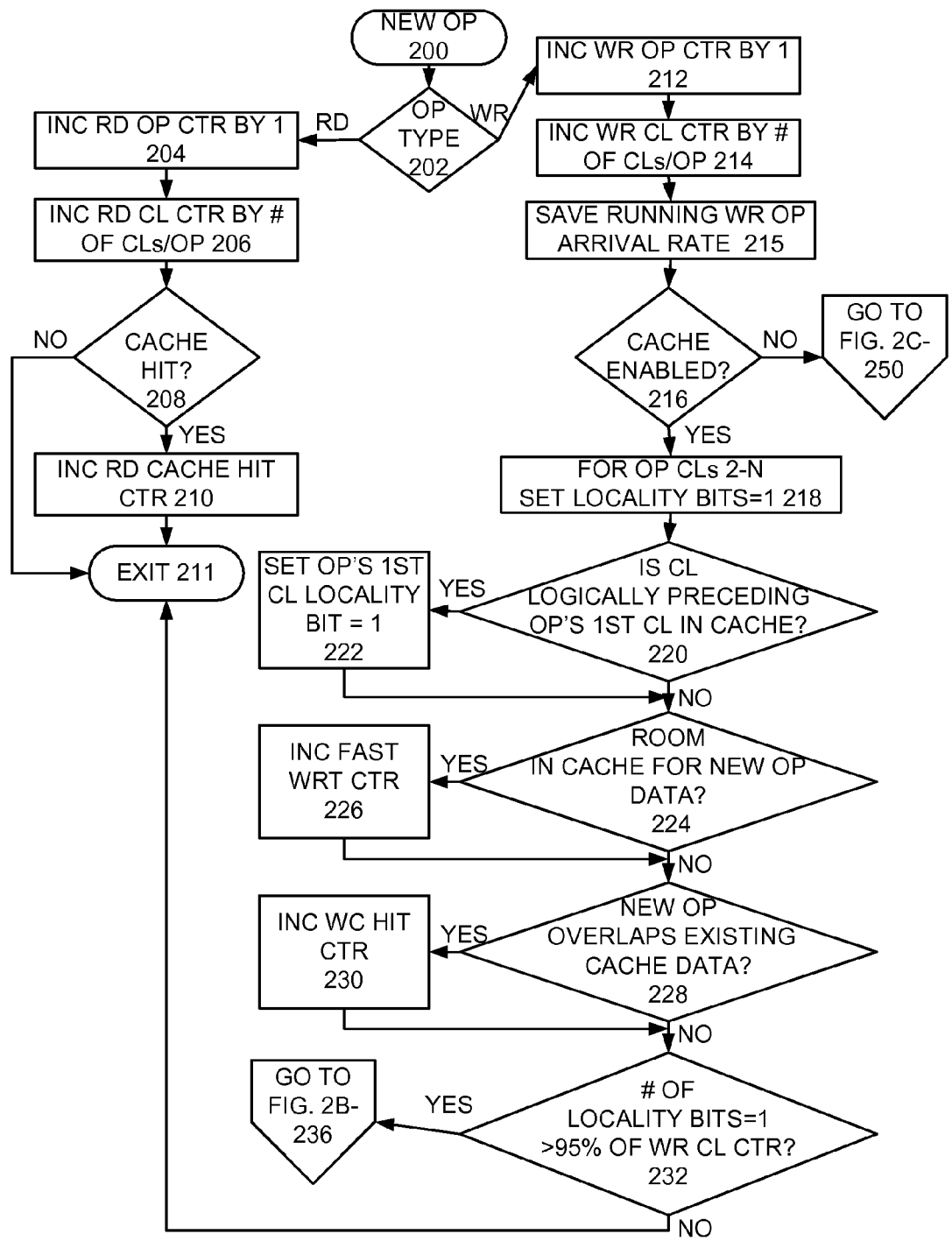
Figure 2B:
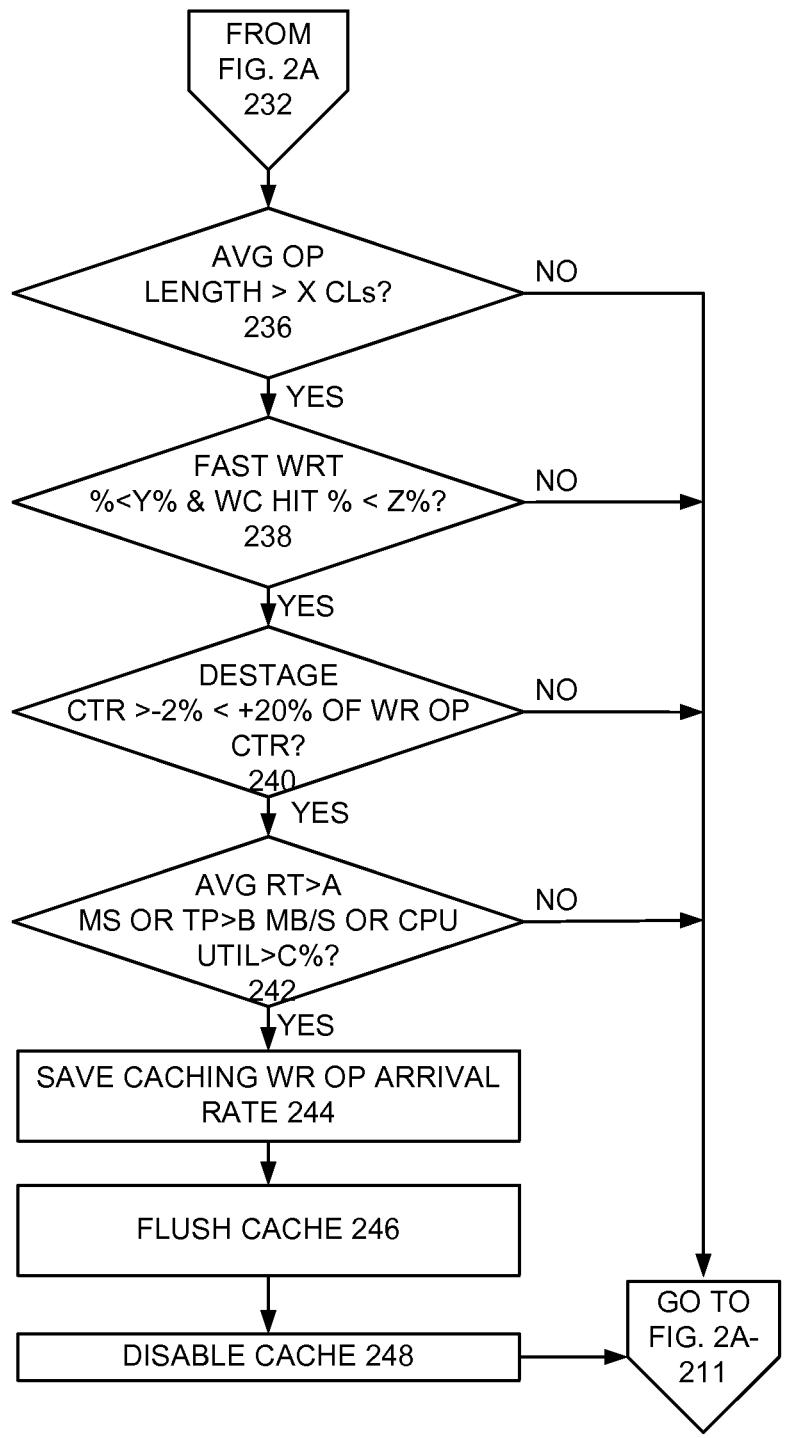

Referring to FIGS. 2A, 2B, and 2C, there are shown example operations for implementing dynamic enabling and disabling of a cache based upon workload in a system of FIG. 1 in accordance with a preferred embodiment.

In FIG. 2A, as indicated in a block 200, a new op is received and checking is performed to identify a read RD op or a write WR op as indicated in a decision block 202. For an identified read RD op, a read op counter CTR is incremented by one as indicated in a block 204. Then a read cache line CL counter CTR is incremented by the number # of cache lines CLs in this op as indicated in a block 206. Checking for a cache hit is performed as indicated in a decision block 208. For an identified cache hit, a read cache hit counter CTR is incremented as indicated in a block 210. Then the operation end as indicated in a block 211.

For an identified write WR op, a write op counter CTR is incremented by one as indicated in a block 212. Then a write cache line CL counter CTR is incremented by the number # of cache lines CLs in this op as indicated in a block 214. Then the running WR op arrival rate is saved as indicated in a block 215.

Checking for the cache being enabled is performed as indicated in a decision block 216. If cache is enabled, for op CLs 2-N locality bits are set equal to one as indicated in a block 218. Checking if the CL logically preceding the Op's first CL in cache is performed as indicated in a decision block 220. If so, then the Op's first CL locality bit is set to one as indicated in a block 222. Then, checking is performed to determine whether there is room in cache for new Op data as indicated in a decision block 224.

If there is room in cache for new Op data, then a fast write counter is incremented as indicated in a block 226. Then checking is performed to determine if the new op overlaps existing cache data as indicated in a decision block 228. If the new op overlaps existing cache data, then a write hit counter is incremented as indicated in a block 230. Next checking is performed to determine if the number of locality bits equal to one is greater than 95% of the write CL counter as indicated in a decision block 232. It should be understood that 95% is only an example, and other numbers could be used. When the number of locality bits equal to one is less than or equal to 95% of the write CL counter, then the operation exit at block 211. Otherwise, when the number of locality bits equal to one is greater than 95% of the write CL counter, then operation continue in FIG. 2B, at block 236.

In FIG. 2B, as indicated in a decision block 236, checking is performed to determine if the average op length is greater than a predefined number of X cache lines. If not, then the operations exit at block 211 in FIG. 2A. Otherwise as indicated in a decision block 238, checking is performed to determine if the fast write % is less than a predefined Y % and WC hit % is less than a predefined Z %. If not, then the operations exit at block 211 in FIG. 2A. Otherwise as indicated in a decision block 240, checking is performed to determine if the destages counter is greater than 98% and less than 120% of the write op counter. If not, then the operations exit at block 211 in FIG. 2A. Otherwise as indicated in a decision block 242, checking is performed to determine if the average RT is greater than a predefined time A ms, or if TP is greater than a predefined rate B MB/s or if the CPU utilization is greater than a predefined C %. If not, then the operations exit at block 211 in FIG. 2A. Otherwise the caching write op arrival rate is saved as indicated in a block 244, and the cache is flushed as indicated in a block 246. Then the cache is disabled as indicated in a block 248. Then the operations exit at block 211 in FIG. 2A.

Referring now to FIG. 2C, after it is determined that the cache is not enabled at decision block 216 in FIG. 2A, checking is performed to determine whether the running caching write op arrival rate is a predefined M % of the caching write op arrival rate for greater than a predefined time N minutes. If so, then the cache is enabled as indicated in a block 252. Otherwise, checking is performed to determine whether the average op length is less than a predefined number of cache lines CLs for greater than a predefined time N minutes as indicated in a decision block 254. If so, then the cache is enabled at block 252. Otherwise, checking is performed to determine whether the device is a hard disk drive HDD as indicated in a decision block 256. If the device is not a hard disk drive HDD, then the operations exit at block 211 in FIG. 2A. Otherwise when the device is a hard disk drive HDD, checking is performed for sequential streams and math is performed to determine the distance from the nearest sequential stream even if there are none as indicated in a block 258. Then the running average distance from the nearest sequential stream is saved as indicated in a block 260. Then checking the average running distance from the nearest sequential stream is greater than a predefined value A % of the HDD size for greater than a predefined time B minutes as indicated in a block 262. If not, then the operations exit at block 211 in FIG. 2A. Otherwise the cache is enabled at block 252.

Figure 3:
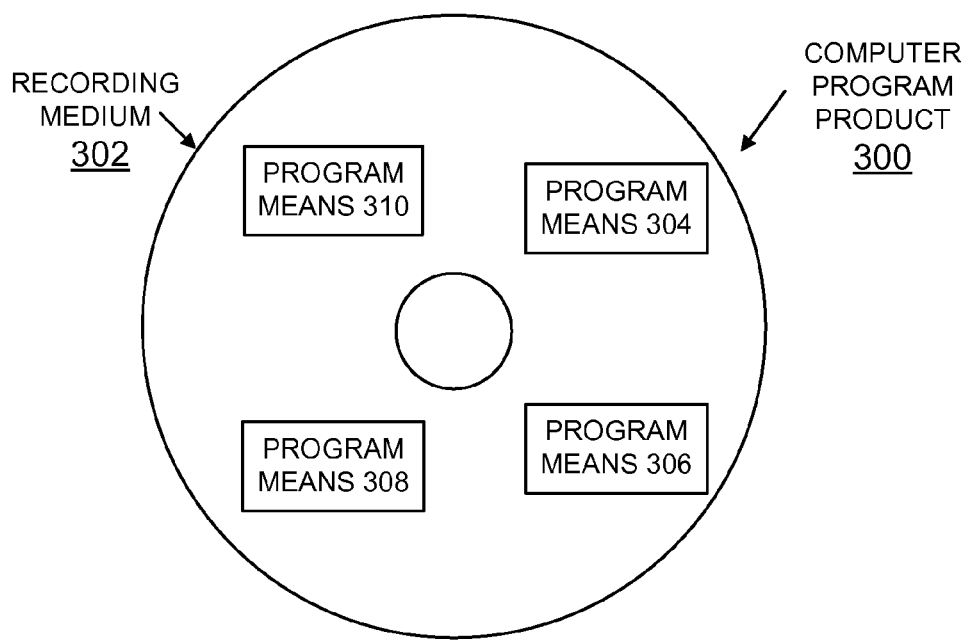
FIG. 3 is a block diagram illustrating a computer program product in accordance with the preferred embodiment.

Referring now to FIG. 3, an article of manufacture or a computer program product 300 of the invention is illustrated. The computer program product 300 is tangibly embodied on a non-transitory computer readable storage medium that includes a recording medium 302, such as, a floppy disk, a high capacity read only memory in the form of an optically read compact disk or CD-ROM, a tape, or another similar computer program product. Recording medium 302 stores program means 304, 306, 308, and 310 on the medium 302 for carrying out the methods for implementing dynamic enabling and disabling of a cache based upon workload of the preferred embodiment in the system 100 of FIG. 1.

A sequence of program instructions or a logical assembly of one or more interrelated modules defined by the recorded program means 304, 306, 308, and 310, direct the computer system 100, for implementing dynamic enabling and disabling of a cache based upon workload of the preferred embodiment.

While the present invention has been described with reference to the details of the embodiments of the invention shown in the drawing, these details are not intended to limit the scope of the invention as claimed in the appended claims.

What is claimed is:

1. A method for implementing dynamic enabling and disabling of cache based upon workload in a computer system comprising:
    monitoring predefined sets of information while the cache is enabled to identify a change in workload, and selectively disabling the cache responsive to a first identified predefined workload;
    monitoring predefined information to identify a second predefined workload while the cache is disabled, and selectively enabling the cache responsive to said identified second predefined workload, said second predefined workload including an average operation length less than a predefined number of cache lines (CLs) for greater than a predefined time N minutes.

2. The method as recited in claim 1 wherein monitoring predefined sets of information while the cache is enabled includes monitoring predefined locality information, said predefined locality information kept in a cache line for each block of data kept in the cache.

3. The method as recited in claim 1 wherein monitoring predefined sets of information while the cache is enabled includes monitoring predefined cache operation statistics information, said cache operation statistics information including one or more of a number of write hits, a number of overwrites, a total number of writes, and a total number of fast writes.

4. The method as recited in claim 1 wherein monitoring predefined sets of information while the cache is enabled includes monitoring predefined performance metrics information, said predefined performance metrics information including one or more of cache induced bottleneck information, cache utilization information, cache queue depth information, and hardware or software operations response time.

5. The method as recited in claim 1 wherein selectively disabling the cache responsive to a first identified predefined workload includes selectively disabling the cache responsive to an identified predefined substantially sequential write workload.

6. The method as recited in claim 1 wherein selectively disabling the cache responsive to a first identified predefined workload includes selectively disabling the cache responsive to identifying a predefined metric threshold value for at least one of monitored locality information, monitored predefined cache operation statistics information, and monitored predefined performance metrics information.

7. The method as recited in claim 1 wherein monitoring predefined information to identify a second predefined workload while the cache is disabled includes monitoring a running average write operation arrival rate.

8. The method as recited in claim 1 wherein monitoring predefined information to identify a second predefined workload while the cache is disabled includes monitoring an average write operation size.

9. The method as recited in claim 1 wherein selectively enabling the cache responsive to said identified second predefined workload includes selectively enabling the cache responsive to an identified predefined workload being different than a substantially sequential write workload.

10. A computer system comprising:
    a memory controller for implementing dynamic enabling and disabling of a cache based upon workload in the computer system,
    a processor;
    said cache coupled to said memory controller and said processor;
    a memory coupled to said memory controller and said processor cache;
    said memory controller monitoring predefined sets of information while said cache is enabled to identify a change in workload, and said memory controller selectively disabling said cache responsive to a first identified predefined workload;
    said memory controller monitoring predefined information to identify a second predefined workload while said cache is disabled, and said memory controller selectively enabling said cache responsive to said identified second predefined workload, said second predefined workload including an average operation length less than a predefined number of cache lines (CLs) for greater than a predefined time N minutes.

11. The system as recited in claim 10 wherein said memory controller monitoring predefined sets of information while the cache is enabled includes said memory controller monitoring predefined locality information, said predefined locality information kept in a cache line for each block of data kept in said cache.

12. The system as recited in claim 10 wherein said memory controller monitoring predefined sets of information while said cache is enabled includes said memory controller monitoring predefined cache operation statistics information, said cache operation statistics information including one or more of a number of write hits, a number of overwrites, a total number of writes, and a total number of fast writes.

13. The system as recited in claim 10 wherein said memory controller monitoring predefined sets of information while said cache is enabled includes said memory controller monitoring predefined performance metrics information, said predefined performance metrics information including one or more of cache induced bottleneck information, cache utilization information, cache queue depth information, and hardware or software operations response time.

14. The system as recited in claim 10 wherein said memory controller selectively disabling said cache responsive to a first identified predefined workload includes said memory controller selectively disabling said cache responsive to identifying a predefined metric threshold value, initiating cache flushing and saving a caching write operation arrival rate.

15. The system as recited in claim 10 wherein said memory controller selectively disabling said cache responsive to a first identified predefined workload includes said memory controller selectively disabling said cache responsive to an identified predefined substantially sequential write workload.

16. The system as recited in claim 10 wherein said memory controller selectively disabling the cache responsive to a first identified predefined workload includes said memory controller selectively disabling said cache responsive to identifying a predefined metric threshold value for at least one of monitored locality information, monitored predefined cache operation statistics information, and monitored predefined performance metrics information.

17. The system as recited in claim 10 wherein said memory controller monitoring predefined information to identify a second predefined workload while said cache is disabled includes said memory controller monitoring a running average write operation arrival rate.

18. The system as recited in claim 10 wherein said memory controller monitoring predefined information to identify a second predefined workload while the cache is disabled includes said memory controller monitoring an average write operation size.

19. The system as recited in claim 10 wherein said memory controller selectively enabling said cache responsive to said identified second predefined workload includes said memory controller selectively enabling the cache responsive to an identified predefined workload being different than a substantially sequential write workload.

20. The system as recited in claim 10 wherein said memory controller selectively enabling said cache responsive to said identified second predefined workload includes said memory controller identifying a predefined threshold value for at least one of an average write operation size, and a running average write operation arrival rate.

* * * * *